March 12, 1929. J. A. COLE 1,705,357

COMBINED VALVE INDICATOR AND IDENTIFIER

Filed May 9, 1928

Inventor
John A. Cole,

By George A. Prevost
Attorney

Patented Mar. 12, 1929.

1,705,357

UNITED STATES PATENT OFFICE.

JOHN A. COLE, OF CHICAGO, ILLINOIS.

COMBINED VALVE INDICATOR AND IDENTIFIER.

Application filed May 9, 1928. Serial No. 276,421.

My invention consists in new and useful improvements in a combined man-hole or valve indicator and identifier, and has for its object to provide a device which is extremely simple in construction and operation.

My invention is particularly adapted for use in connection with the valves and meters in the man-holes of a city water system, and is embellished with suitable indicia for identifying the man-hole and valve, and is also provided with means for indicating whether or not the valve is open.

With the above and other objects in view which will appear as the description proceeds, my invention consists in the novel features herein set forth, illustrated in the accompanying drawing, and more particularly pointed out in the appended claims.

Referring to the drawing in which numerals of like character designate similar parts throughout the several views, Fig. 1 is a view in side elevation, showing my improved device suspended in a man-hole, the valve indicator being in the open position.

Figure 1:
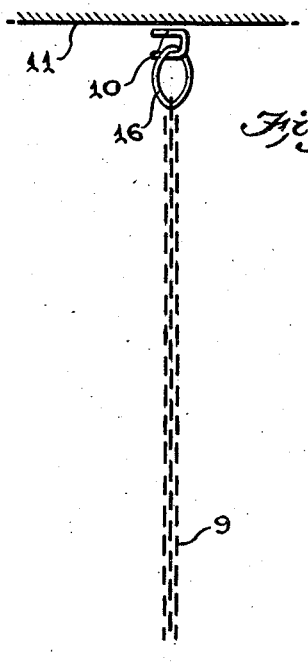
Figure 2:
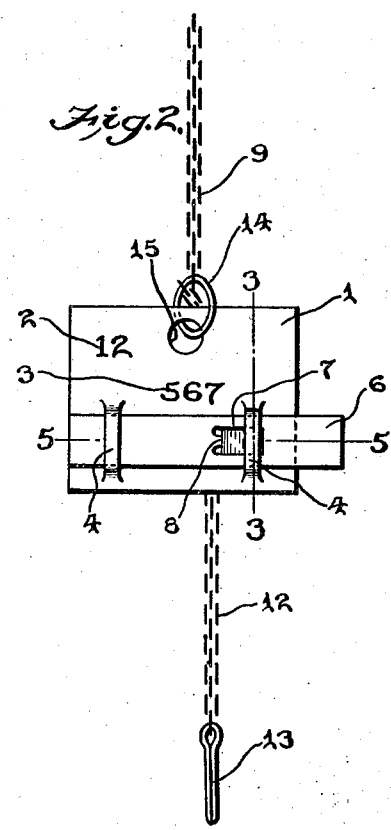
Fig. 2 is a similar view showing the device in closed position.
Figure 3:
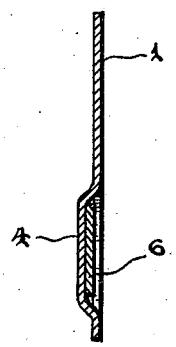
Fig. 3 is a sectional view taken on line 3—3 of Fig. 2.
Figure 4:
Fig. 4 is a section taken on line 4—4 of Fig. 1.
Figure 5:
Fig. 5 is a section taken on line 5—5 of Fig. 2.

In the drawing, 1 designates a flat plate of suitable metal, preferably brass, embellished upon its face as at 2 and 3, with suitable indicia for identifying a man-hole valve, respectively. At predetermined points, the lower portion of the plate 1 is stamped out as at 4, to form a plurality of integral straps or supports for slidably retaining a second and smaller plate 6. Intermediate the straps 4, the plate 1 is provided with an aperture 5, and likewise the plate 6 is apertured intermediate its ends as at 7, said apertures being adapted to register with one another.

In order to prevent the plate 6, from being moved too far in either direction, or from becoming out of engagement with the straps 4, I provide an inwardly bent lug 8 along one of the vertical edges of the aperture 7, in said plate, which lug extends into the aperture 5 in the plate 1 and is adapted to abut either vertical edge of said aperture.

Near the upper edge of the plate 1, I provide an aperture 15 adapted to receive a ring 14, for securing the ends of the chains 9 and 12. The chain 9 is provided at its free end with another ring 16 for engaging the hook 10 in the man-hole 11, whereby the device may be suspended in said man-hole. The chain 12 is considerably shorter than the chain 9, and is provided at its free end with a needle 13 for the purpose hereinafter set forth.

Having described in detail the construction and arrangement of parts of my improved indicator and identifier, its operation and use are as follows.

As before stated, the device is for use in identifying the man-hole and valve, and indicating whether said valve is open or closed. If the operator leaves the valve in a closed position, he slides the plate 6 in the straps 4 to the right to its extreme position, thus throwing the apertures 5 and 7 out of alignment to indicate that the valve is closed. He then hangs the plate 1 in the man-hole by means of the chain 9, the ring 16 at the end thereof engaging the hook 10 in said man-hole.

If the valve is opened, the indicator and identifying tag is removed from the man-hole by the operator who slides the plate 6 to the left, to its extreme longitudinal position, which causes the apertures 5 and 7 to register with one another. He then inserts the needle 13 on the end of the chain 12, in said apertures from the rear of the plate 1, and draws said chain therethrough, as clearly shown in Fig. 1, to indicate that the valve is open, said chain 12 retaining said apertures in registering position. The device is then returned to its position in the man-hole.

From the foregoing it is believed that my invention may be clearly understood by those skilled in the art without further description, it being borne in mind that numerous changes may be made in the details of construction, without departing from the spirit of the invention as set forth in the following claims.

What I claim and desire to secure by Letters Patent is:

1. A combined valve indicator and identifier, comprising a main plate provided upon its face with suitable indicia for identifying a valve, a second plate of greater length, secured to and adapted to reciprocate longitudinally on said main plate, cooperating means on said plates for indicating the position of said valve.

2. A combined valve indicator and identifier, comprising a main plate provided upon its face with suitable indicia for identifying a valve, a second plate of greater length and less width, secured to and adapted to reciprocate longitudinally on said main plate, cooperating means on said plates for indicating the position of said valve, and means for suspending said device in a man-hole.

3. A device as claimed in claim 1, wherein said cooperating means consist of an aperture in each plate, adapted to be thrown into and out of register when said second plate is reciprocated.

4. A device as claimed in claim 1, wherein said cooperating means consist of an aperture in each plate adapted to be thrown into and out of register when said second plate is reciprocated, and a flexible member adapted to be inserted in said apertures when the same are in registering position.

5. A valve indicator, comprising a main plate, a second plate secured to said main plate and adapted to reciprocate longitudinally thereon, each of said plates having an aperture adapted to register with one another when said second plate is moved, a flexible member adapted to be inserted in said apertures, means for preventing said last named plate from becoming disengaged from said main plate, and means for suspending said device in a man-hole.

6. A device as claimed in claim 5, wherein said main plate is embellished with identifying indicia.

7. A valve indicator, comprising a main plate provided upon its face with suitable indicia for identifying a valve, a second plate of greater length and less width than said main plate, a plurality of straps on said main plate adapted to slidably engage said second plate, whereby the latter is permitted to be reciprocated longitudinally on said main plate, and an aperture in each of said plates adapted to register with the corresponding aperture in the other plate, when said second plate is reciprocated.

8. A valve indicator as claimed in claim 7, wherein said straps are integral with said main plate.

In testimony whereof I affix my signature.

JOHN A. COLE.